(12) United States Patent
Buckwalter

(10) Patent No.: US 8,583,269 B2
(45) Date of Patent: Nov. 12, 2013

(54) ISOCHRONOUS AUDIO NETWORK SOFTWARE INTERFACE

(75) Inventor: Paul Benjamin Buckwalter, Goshen, IN (US)

(73) Assignee: Harman International Industries, Incorporated, Stamford, CT (US)

( * ) Notice: Subject to any disclaimer, the term of this patent is extended or adjusted under 35 U.S.C. 154(b) by 272 days.

(21) Appl. No.: 13/039,898

(22) Filed: Mar. 3, 2011

(65) Prior Publication Data

US 2011/0153049 A1    Jun. 23, 2011

Related U.S. Application Data

(63) Continuation of application No. 10/578,766, filed as application No. PCT/US2004/036881 on Nov. 8, 2004, now Pat. No. 7,917,642, which is a continuation-in-part of application No. 10/704,164, filed on Nov. 7, 2003, now abandoned.

(51) Int. Cl.
*G06F 17/00* (2006.01)

(52) U.S. Cl.
USPC ............................................ 700/94; 709/225

(58) Field of Classification Search
USPC ............................. 709/231; 715/227; 700/94
See application file for complete search history.

(56) References Cited

U.S. PATENT DOCUMENTS

| | | | |
|---|---|---|---|
| 5,357,511 A | 10/1994 | DiNapoli et al. | 370/62 |
| 5,406,634 A | 4/1995 | Anderson et al. | 381/82 |
| 5,487,167 A * | 1/1996 | Dinallo et al. | 715/203 |
| 5,761,430 A * | 6/1998 | Gross et al. | 709/225 |
| 5,761,431 A | 6/1998 | Gross et al. | 395/200.55 |
| 6,161,138 A | 12/2000 | Gross et al. | 709/225 |
| 6,339,584 B1 | 1/2002 | Gross et al. | 370/225 |
| 6,483,846 B1 | 11/2002 | Huang et al. | 370/445 |
| 6,675,054 B1 * | 1/2004 | Ruberg | 700/94 |
| 7,493,657 B1 | 2/2009 | Krishnaswamy et al. | 726/22 |
| 7,917,642 B2 | 3/2011 | Buckwalter | 709/231 |
| 2001/0001564 A1 * | 5/2001 | Smyers | 348/552 |
| 2001/0004266 A1 | 6/2001 | Itsukaichi | 348/220 |
| 2001/0009554 A1 * | 7/2001 | Katseff et al. | 370/466 |
| 2001/0037382 A1 * | 11/2001 | Anttila | 709/223 |
| 2002/0071424 A1 | 6/2002 | Chiu et al. | 370/352 |
| 2004/0268359 A1 | 12/2004 | Hanes | 719/310 |
| 2005/0100023 A1 | 5/2005 | Buckwalter | 370/395.52 |
| 2005/0108392 A1 | 5/2005 | Glasser et al. | 709/224 |
| 2006/0130144 A1 * | 6/2006 | Wernicke | 726/24 |
| 2007/0153774 A1 * | 7/2007 | Shay et al. | 370/352 |

\* cited by examiner

*Primary Examiner* — Fan Tsang
*Assistant Examiner* — David Siegel
(74) *Attorney, Agent, or Firm* — Brinks Gilson & Lione

(57) ABSTRACT

A computer system includes a network interface that transmits and/or receives packets over a network. The packets may include isochronous audio packets and data packets. The computer system may have an operating system in which isochronous audio software is executable to extract audio data from the isochronous audio packets, or format audio data into isochronous audio packets. The system may also include other software executable within the operating system substantially in parallel with the isochronous audio software. The other software may extract data from the data packets.

20 Claims, 6 Drawing Sheets

ISOCHRONOUS AUDIO NETWORK SOFTWARE INTERFACE

This application is a continuation application of, and claims priority under 35 U.S.C. §120 to, U.S. patent application Ser. No. 10/578,766, "ISOCHRONOUS AUDIO NETWORK SOFTWARE INTERFACE" filed May, 4, 2007, the entire contents of which are incorporated by reference, which is a National Stage Entry of International Patent Application PCT/US04/36881, filed Nov. 8, 2004. International Patent Application PCT/US04/36881 claims priority under 35 U.S.C. §120 to U.S. patent application Ser. No. 10/704,164, filed Nov. 7, 2003, the entire contents of which are incorporated by reference.

BACKGROUND OF THE INVENTION

1. Technical Field

This invention relates to an interface, and more particularly, to a software interface that may communicate isochronous audio over a switched network.

2. Related Art

The transmission and reception of digital audio signals are becoming more common. Digital audio signals may be transmitted in a compressed format, or in an uncompressed format. While signal compression reduces the bandwidth needed to store and transmit digital audio signals, signal compression can cause perceivable delays and signal loss in some audio systems.

Some audio systems communicate uncompressed data across real-time, digital audio networks. These networks are considered isochronal when audio devices on the network respond to a clock signal in a manner similar to a synchronous serial communication system. The networks rely on dedicated hardware to interface audio devices.

One known proprietary system uses proprietary interfaces to control timing and other low-level processing tasks. These proprietary interfaces cannot communicate in a Transmission Control Protocol/Internet Protocol ("TCP/IP") used by the Internet. A second interface is needed. Because multiple interfaces are required to transmit and receive digital audio signals and provide access to the Internet, proprietary systems may be expensive.

Therefore, there is a need for a system that can transmit or receive isochronous audio using a standard network interface.

SUMMARY

This invention provides a system that includes a network interface. The network interface is compatible with multi-tasking, multi-threaded operating is systems and may send and receive isochronous audio packets and other data over a switched network. The system includes software that extracts audio data from isochronous audio packets.

The system may also use software that formats audio data into isochronous audio packets. The isochronous audio packets may be formatted to many protocols, including a CobraNet specification. The isochronous audio packets and other data packets may be sent over the switched network.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

First Isochronous Audio Controller

Figure 1:
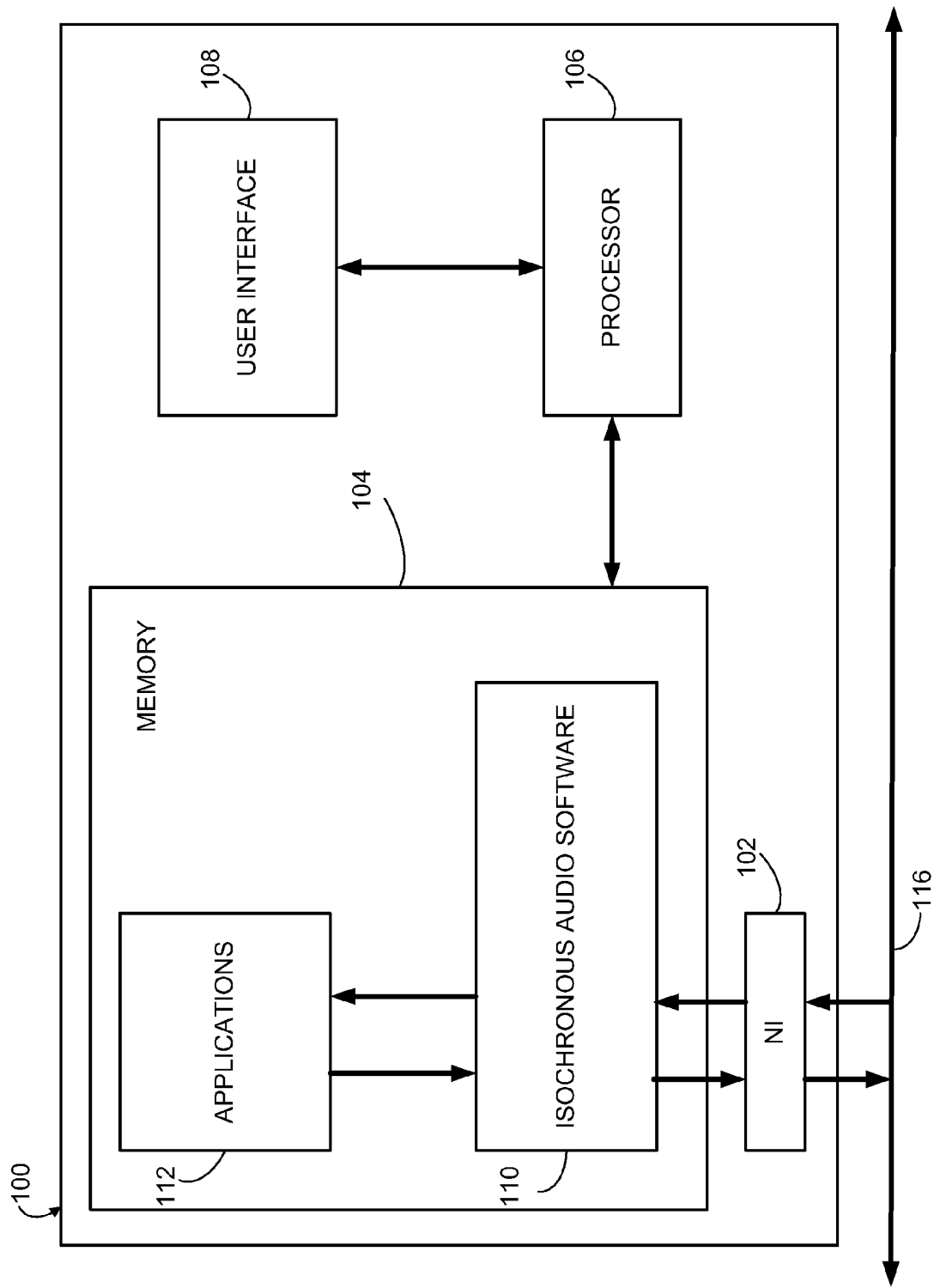
FIG. 1 is a first isochronous audio controller.

A first illustrative isochronous audio controller 100 is shown in FIG. 1. The isochronous audio controller 100 may be included in operating system adapted to execute a plurality of applications substantially in parallel. The operating system may be a non-real time system capable of multi-tasking, multi-threaded execution of applications to enable the substantially parallel execution of the applications. The multi-tasking, multi-threaded execution of the applications by the operating system may be within a computing environment, such as an operating system included in a computer device. Example operating systems includes Microsoft Windows, UNIX, LINUX, etc. The isochronous audio controller 100 may include a network interface 102, a memory 104, a processor 106, and a user interface 108. The network interface 102 connects the isochronous audio controller 100 to another device and may be a card or a socket that transfers information from one place to another.

In FIG. 1, the network interface 102 may include a PCM-CIA card, an ISA card, a PCI card, a networking circuit or another device. These devices may provide network connectivity in accordance with a standard, such as an Institute of Electrical and Electronics Engineers ("IEEE") 802 standard, such as IEEE 802.3 standard, an Ethernet standard, an IEEE 1394 standard, a wireless Ethernet standard, a Fiber Distributed Data Interface ("FDDI") standard, or a similar standard. Preferably, the network interface 102 operates at a frequency of about 100 Mbps or higher.

The network 116 may also conform to one of these standards. The network 116 may be any type of network capable of packet based data transmission. In one example, the network may be a switched Ethernet network.

The memory 104 is a medium that preserves data for retrieval. It may include a hard disk drive, a compact disc drive, a digital versatile disc drive, a Random Access Memory ("RAM"), a Read Only Memory ("ROM"), a Programmable Read-Only Memory ("PROM"), an Electrically Erasable Programmable Read-Only Memory ("EEPROM"), a flash memory, or any other digital storage device. The processor 106 may include a Central Processing Unit ("CPU") such as an Intel Pentium® microprocessor, a Sun SPARC® microprocessor, a Motorola microprocessor, an International Business Machines (IBM) processor, or any other processor.

The user interface 108 may include software or hardware that enables a user to access an application. The user interface 108 may include an absolute pointing device, a relative pointing device, or a physical pointing device. Other cursor control devices may also be used including a keyboard and a touch screen system.

The memory 104 may include isochronous audio software 110, and applications 112. The isochronous audio software 110 may include network drivers to provide low-level communications with network interface 102. Additionally, the network drivers included with the isochronous audio software 110 may support protocols such as a TCP/IP, IPX/SPX, NetBIOS, ATM, NetBEUI, AppleTalk, and Token-Ring. The isochronous audio software 110 may also provide a software interface for the applications 112. The network drivers of the isochronous audio software 110 may include drivers available from the manufacturer of the network interface 102, from the supplier of the applications 112 or from a third party. In addition, the isochronous audio software 110 may provide a software interface between the isochronous audio software 110 and the network interface 102. The isochronous audio software 110 may also be adapted to be compatible with and executable within pre-existing operating systems with pre-existing hardware, such as the Microsoft Windows operating system operating on a personal computer. In one example, the isochronous audio controller 100 includes an operating system where the network drivers included in the isochronous audio software 102 may implement the Open System Interconnection (OSI) model. The OSI model is a networking framework for implementing network protocols in seven layers. Packets or datagrams are passed from one layer to the next.

The isochronous audio software 110 may conform to an isochronous audio specification to facilitate communication with other isochronous audio devices. The specification may include data format, protocol and/or any other data presentation and communication related parameters. The isochronous audio software 110 may process isochronous audio data, play audio data, and/or save audio data in a recordable medium, such as a magnetic media (hard disk) or an electronic media. The isochronous audio software 110 may also receive audio data from a medium, such as a hard disk, or another source, such as a microphone, and create isochronous audio data for transmission over the network 116. In addition, the isochronous audio software 110 may detect the type of data included in data packets that are received by the isochronous audio software 110. The isochronous audio software 110 may decode the received packets that are related to audio data. If, on the other hand, the packets are related to the other applications being executed in the operating system, the packets may be passed through the isochronous audio software 110 to the applications 112 unaltered by the isochronous audio software 110 (passed through in the same condition as they were received from the switched network).

Second Isochronous Audio Controller

Figure 2:
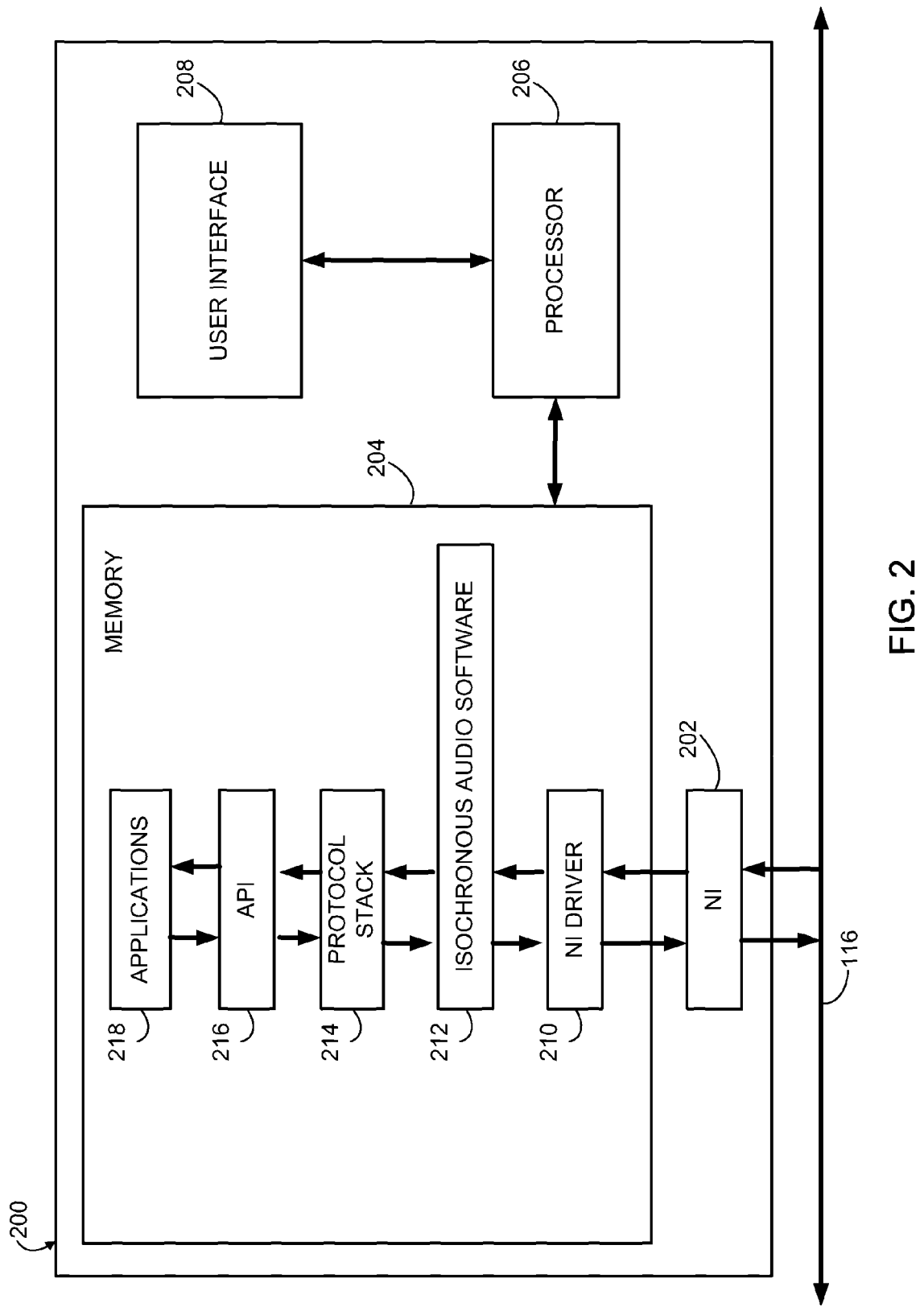
FIG. 2 is a second isochronous audio controller.

A second illustrative isochronous audio controller 200 operating within a multi-tasking, multi-threading operating system is shown in FIG. 2. The isochronous audio controller 200 may include a network interface 202, a memory 204, a processor 206, and a user interface 208. The operating system, the network interface 202, the memory 204, the processor 206, and the user interface 208 may have the same structure and functionality as the network interface 102, the memory 104, the processor 106, and the user interface 108 described previously.

The memory 204 may include layers of network software that provide network support. The memory 204 may also include a network interface driver 210, isochronous audio software 212, a protocol stack 214, an Application Program Interface ("API") 216, and one or more applications 218. The applications 218 may be operated substantially in parallel within the operating system. The isochronous audio software 200 may also operate in the operating system substantially in parallel with the other applications 218 in the system.

The network interface driver 210 may be a hardware driver provided by the manufacturer of the network interface 202, a hardware driver provided by an operating system vendor, or a hardware driver provided by a third party. The network interface driver 210 enables transmission and receipt of packets via the network 116 for each of the applications. The isochronous audio software 212 may provide communicate between the applications 218 and the network interface driver 210. In addition, the isochronous audio software 212 may provide a communication interface between the isochronous audio software 220 and the network interface driver 210.

The protocol stack 214 comprises a set of protocols that work together on different levels to enable the applications 218 to communicate on the network 116. An example protocol stack 214 may include TCP/IP, IPX/SPX, NetBIOS, ATM, NetBEUI, AppleTalk, and Token-Ring protocols. The protocol stack 214 may be a protocol suite available from the supplier of an operating system, or may be a protocol stack provided by a third party. Similarly, the API 216 may be an API available from the supplier of the operating system, or may be an API provided by a third party. (The isochronous audio software 212 may include its own protocol stack and API.) The applications 218 may include many other user interfaces and applications, such as a browsers, news clients, e-mail clients, file servers, or other servers or clients.

During operation, a stream of packets may be received from the network 116 and buffered by the network interface 202. In response to the receipt of the packets, the network interface 202 may generate an interrupt request to the operating system. The operating system, which is involved in multi-tasking, multi-threaded operation within a computing environment, will acknowledge the interrupt request based on the priority of the interrupt request with regard to other processes being executed by the operating system. When the interrupt request reaches an appropriate level of priority, the operating system may acknowledge the interrupt request by providing an interrupt to the network interface 202. Upon receipt of system control from the operating system due to the provided interrupt, the network interface driver 210 may be executed by the operating system to pass the packets to the isochronous audio software 212. The isochronous audio software 212 may be executed by the operating system to analyze each of the packets to determine a data type. Packets that are determined to include isochronous audio data (isochronous audio packets) may be decoded by the isochronous audio software 212. In contrast, data packets may be passed to the protocol stack 214 without alteration or any other form of processing of these packets by the isochronous audio software 212.

With the same interrupt provided by the operating system to the network interface 202, the operating system enables execution of the isochronous audio software application 212. Accordingly, when the network interface 202 receives isochronous audio packets from the network 116, the resulting interrupt provided by the operating system results in the sequential execution by the operating system of the network interface 202 and the isochronous audio software 212. The isochronous audio software 212 may process isochronous audio data, play audio data, and/or save audio data in a recordable medium.

The isochronous audio software 212 may also receive audio data from a medium, such as a compact disc, or another source, such as a tape deck or a radio receiver, and create and send isochronous audio data to the network interface driver 210 for transmission over the network 116. The isochronous audio data created by the isochronous audio software 212 may be buffered and then passed to the network interface driver 210. The network interface driver 210 may transfer the data to the network interface 202 for transmission over the network 116. Creation and passing of the isochronous audio data may occur when the operating system enables execution of the isochronous audio software 212. Execution may be enabled by the operating system when an interrupt is provided to the network interface 202 by the operating system in response to receipt by the operating system of an interrupt request.

Third Isochronous Audio Controller

Figure 3:
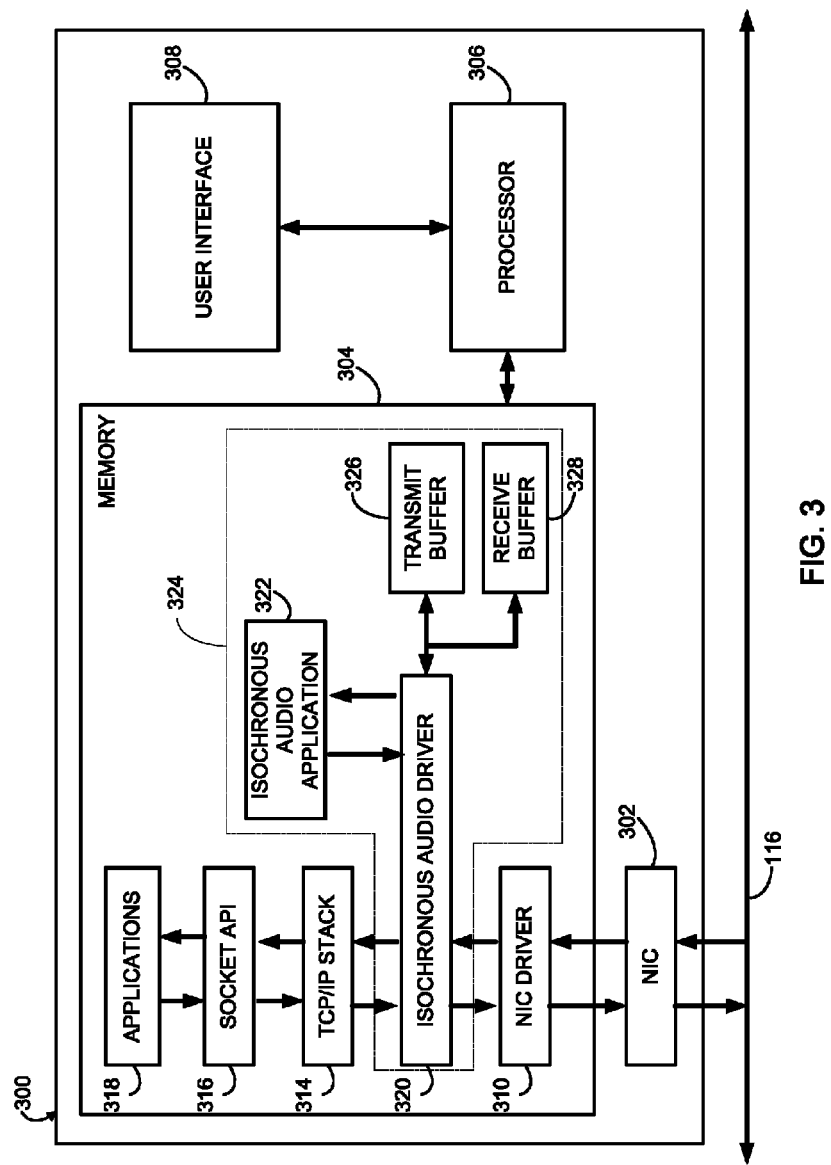
FIG. 3 is a third isochronous audio controller.

A third illustrative isochronous audio controller 300 operating within a multi-tasking multi-threaded operating system is shown in FIG. 3. The isochronous audio controller 300 may include a network interface 302, a memory 304, a processor 306, and a user interface 308.

The memory 304 may include layers of network software operating substantially in parallel in the operating system that provide network support for the applications 318. The memory 304 may include a network interface driver 310, a TCP/IP stack 314, a socket API 316, and one or more applications 318. The isochronous audio controller 300 may also include an isochronous audio driver 320, an isochronous audio application 322. Alternatively, the isochronous audio driver 320 may be integrated with the isochronous audio application 322 to form isochronous audio software 324.

The isochronous audio driver 320 may operate in the driver level of the operating system. The isochronous audio application may operate in a level above the driver level, such as an application level. Accordingly, in a multi-tasking, multi-threaded operating system such as Microsoft Windows, the isochronous audio driver may operate at the driver level and the isochronous audio application may operate be at the application level. In operating systems that include a safe mode, or protected mode, when the safe mode is activated, drivers are enabled but applications are disabled. Accordingly, in such a safe mode, the isochronous audio driver may be enabled and the isochronous audio application may be disabled. Also included in the memory 304 in communication with the isochronous audio driver 320 is a transmit buffer 326 and a receive buffer 328 to temporarily store audio data. The transmit buffer 326 and the receive buffer 328 may also be part of the isochronous audio software 324.

The network interface driver 310 may be a hardware driver provided by an operating system vendor, a hardware driver provided by the manufacturer of the network interface 302, or a hardware driver provided by a third party. The TCP/IP stack 314 may be a protocol stack available from the supplier of the operating system, or may be a TCP/IP stack included with a firewall application, or may be a stand alone protocol stack. Similarly, the socket API 316 may be an API available from the supplier of the operating system, or may be an API provided by a third party. In addition to, or in place of, the TCP/IP stack 314 and the socket API 316, protocol stacks and APIs for other protocols such as IPX/SPX, NetBIOS, NetBEUI, AppleTalk, ATM and/or Token-Ring may also be used. For simplicity, the TCP/IP stack 314 and the socket API 316 are discussed. In FIG. 3, the isochronous audio driver 320 may include its own protocol stack and API, and may not rely upon another protocol stack. Accordingly, the isochronous audio driver 320 may be operated substantially in parallel with the TCP/IP stack 314 and the API 316.

The applications 318 may include many other user interfaces and applications, such as a browsers, content providing clients, news clients, e-mail clients, file servers, or other servers or clients capable of operation substantially in parallel with the isochronous audio software 324. The isochronous audio driver 320 and the isochronous audio application 322, or, alternatively, the isochronous audio software 324, may process isochronous audio data, play audio data, save audio data in a recordable medium, receive audio data from a medium, and/or create and send isochronous audio data to the network interface driver 310 for transmission over the network 116.

Standard TCP/IP Processing Example

In FIG. 3, the applications 318 do not communicate directly with the network interface 302. Rather, the isochronous audio controller 300 includes a high-level network interface through the socket API 316. The applications 318 send and receive network requests and responses to and from the socket API 316, which communicates with the next lower layer, such as the TCP/IP stack 214.

When one of the applications 318 is executed by the operating system to transmit data over the network 116, a request is generated by the application 318. When the socket API 316 receives the request from one of the applications 318, the socket API 316 formats the request and forwards the request to the TCP/IP stack 314. The TCP/IP stack 314 reformats the request as one or more data packets. The term "data packet" refers to a variable or fixed length transmission unit that includes binary digits representing information other than isochronous audio data or data included in synchronization packets. As discussed later, synchronization packets may provide timing information used with the isochronous audio data. The units of information may contain both data and a header including an identification number, source and destination addresses (including multicast addresses), and sometimes error control data. Data packets may include IP packets, UDP packets, Ethernet packets, and IPX packets. The term "isochronous audio packet" describes packets of information that contain isochronous audio data. The data may be formatted to be transmitted over a network, such as formatted to be an Ethernet packet. The formatted data may contain a header having an identification number, source and destination addresses (including multicast addresses), and sometimes error control data.

The TCP/IP stack 314 forwards data packets to the isochronous audio driver 320. The isochronous audio driver 320 may analyze the packets and forward untouched those packets identified as data packets to the network interface driver 310. In this example, the network interface driver 310 is the lowest layer of the software. The network interface driver 310 sends data packets directly to the network interface 302.

When a response is received, the data packets travel in a reverse order of a request. That is, the data packets are first received by the network interface 302. The network interface 302 reads and buffers the packets. The packets are then passed by the network interface driver 310 to the isochronous audio driver 320. The isochronous audio driver 320 determines that the packets are data packets and should be passed untouched to applications 318 via the TCP/IP stack 314. The packets are then decoded by the TCP/IP stack 314, and the data extracted from the packets during decoding is further processed by the socket API 316.

Isochronous Audio Processing Example

In FIG. 3, the isochronous audio controller 300 includes the isochronous audio application 322 and the isochronous audio driver 320. The isochronous audio driver 320 may be operated substantially in parallel with the TCP/IP stack 314 and the Socket API 316 by the operating system. The isochronous audio driver 320 provides an interface between the network interface driver 310 and the isochronous audio application 322. The isochronous audio driver 320 may include, create, or access the transmit buffer 326 and the receive buffer 328.

The isochronous audio software 324 processes isochronous audio packets received over the network 116 to decode and extract audio data. Decoding may include removing a header, such as an Ethernet packet header, that includes an identification number of the packet, a source address and a destination address. In addition, decoding may include converting isochronous audio data included in the isochronous audio packet to audio data. The isochronous audio data may be formatted in accordance with a predetermined format, such as a CobraNet format.

The isochronous audio software 324 also processes audio data to encode the audio data and generate isochronous audio packets that can be transmitted over the network 116. Encoding audio data may include reformatting the audio data in accordance with a predetermined format, such as a CobraNet format. In addition, encoding audio data may include adding a header to the asynchronous audio data, such as an Ethernet packet header that includes an identification number of the packet, a source address and a destination address.

Execution of the isochronous audio software 324 in the operating system occurs as part of an interrupt requested by the network interface 302. An interrupt resulting in the execution by the operating system of the isochronous audio software 324 is based on an interrupt request generated by the network interface 302 when isochronous audio packets or synchronization packets are received by the network interface 302. A synchronization packet refers to a packet that includes timing information related to transmission of an isochronous audio packet. The timing information includes a frame number representative of network timing provided by a network clock, a bundle number indicative of one of a number of transmission channels for transmitting audio date and a MAC address of the network interface 302.

Receipt of a synchronization packet by the network interface 302 may result from a synch request generated by the isochronous audio software 324. A synch request may include the bundle number that the isochronous audio software 324 is currently processing and the MAC address of the network interface 302. The synch request may be generated by the isochronous audio software 324 and passed to the network interface driver 310. When the request is received by the network interface driver 310, it is conveyed to the network 116 through the network interface 302.

Figure 4:
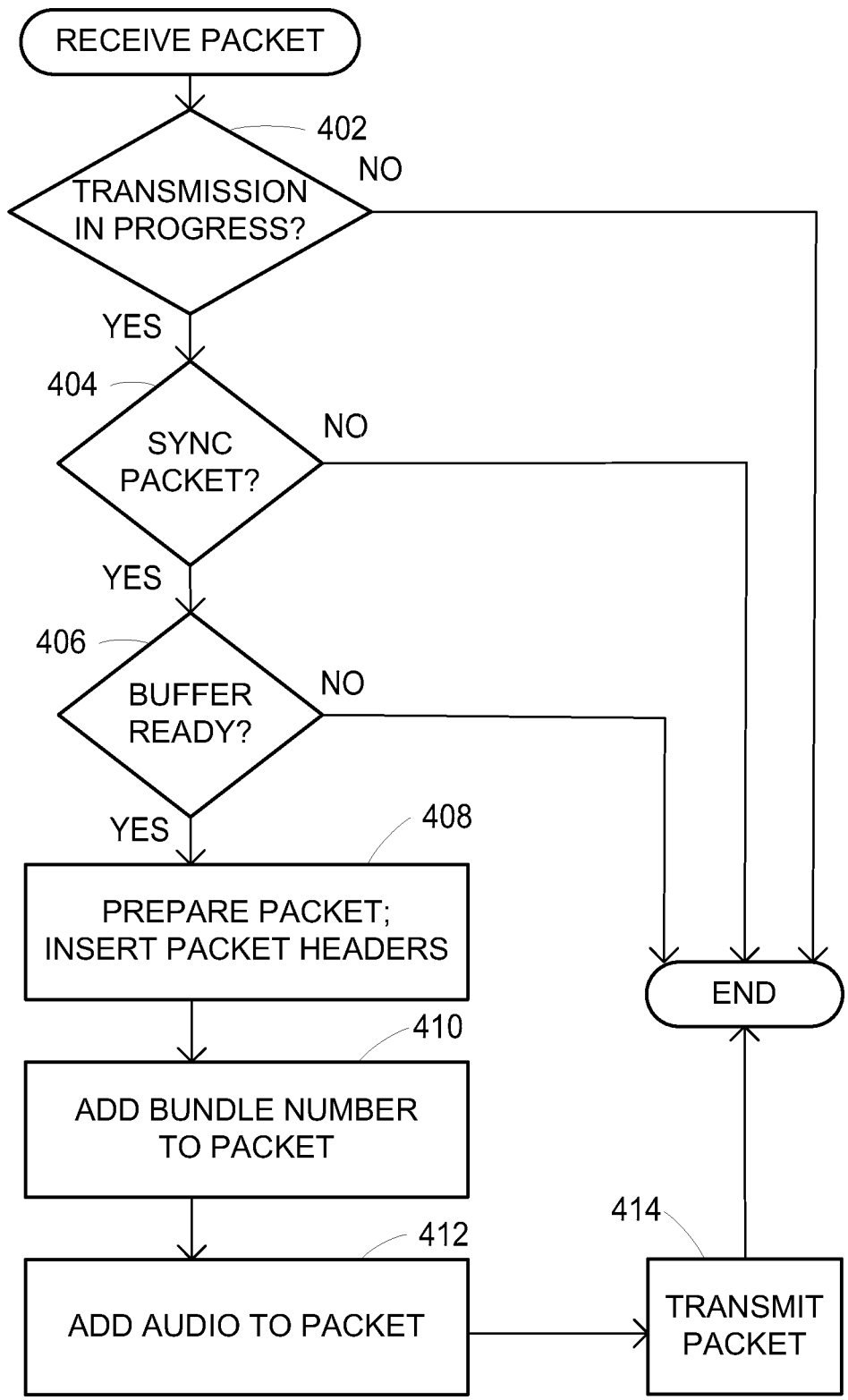
FIG. 4 is a transmission flow chart for an isochronous audio driver.

In FIGS. 3 and 4, when an isochronous audio packet or a synchronization packet is received by the network interface 302 an interrupt request may be generated. When the operating system transfers control to the network interface 302 based on the interrupt request, the isochronous audio packet or synchronization packet may be passed by the network driver 310 to the isochronous audio driver 320. The isochronous audio driver 320 may identify the packet as related to audio data, and processes the packet to extract audio data or timing information. When an isochronous audio packet or a synchronization packet is received, the isochronous audio driver 320 may be executed by the operating system to determine whether the isochronous audio application 322 is transmitting audio data at 402. This determination may assess if the isochronous audio controller 300 has been authorized to transmit isochronous audio packets over the switched network 116. Authorization may be based on a flag that is manually set, a logic operation, or any other mechanism to determine when operation of the isochronous audio software 324 should be enabled/disabled. In addition, the isochronous audio driver 320 may determine whether the decoded packet includes the correct bundle number, a frame number and the MAC address of the network interface 302. The correct bundle number is the bundle number currently being processed by the isochronous audio software 324.

If the isochronous audio application 322 is not enabled to transmit data, the isochronous audio driver 320 stops and waits for the next packet. At 404, the isochronous audio driver 320 determines whether the received packet is a synchronization packet. The transmission of an isochronous audio packet by the isochronous audio driver 320 may occur as a result of reception of a synchronization packet. If the received packet is not a synchronization packet, then the isochronous audio driver 320 stops processing and waits for the next packet.

If the received packet is a synchronization packet, then at 406 the isochronous audio driver 320 determines whether the isochronous audio data in the transmit buffer 326 should be sent. The isochronous audio driver 320 may be executed by the operating system to generate isochronous audio data that is provided to the transmit buffer 326. The isochronous audio data generated by the isochronous audio driver 320 includes audio data from one or more channels (slots) of audio data that is sampled at a predetermined frequency and resolution. The isochronous audio data may be pulse-code modulated (PCM), although other modulation schemes may be used. PCM resolutions may be about 16 bits, 20 bits, or 24 bits in length. Some sampling frequencies that may be used include 32 KHz, 44 KHz, 48 KHz, and 96 KHz among other acceptable sampling frequencies. In this example, the maximum number of channels per isochronous audio packet is eight. Such isochronous audio data related information may be included in the isochronous audio data. It may be necessary to buffer isochronous audio data prior to a transmission so that there is enough isochronous audio data to fill an isochronous audio packet when a synchronization packet is received. If the isochronous audio data in the transmit buffer 326 is not ready to be sent, then the isochronous audio driver 320 stops until it receives the next packet.

If isochronous audio data within the transmit buffer 326 should be sent, then at 408 the isochronous audio driver 320 may prepare an isochronous audio packet and inserts the appropriate headers. The headers may include information such as the resolution of the samples, the frequency of the samples, and how many channels (slots) of audio data are included in the isochronous audio packet. In addition, the headers may include a network packet header as previously discussed. At 410, the isochronous audio driver 320 may add the bundle number and the frame number to the isochronous audio packet. The bundle number and frame number may be previously received in a synchronization packet and decoded by the isochronous audio driver 320. As previously discussed, bundle numbers facilitate communication of multiple channels of audio data. At 412, the isochronous audio driver 320 may add isochronous audio data from the transmit buffer 326 to the isochronous audio packet, and may send the isochronous audio packet for transmission over the network at 416. When the isochronous audio packet is received by the network interface driver 310, it may be conveyed to the network 116 through the network interface 302.

Figure 5:
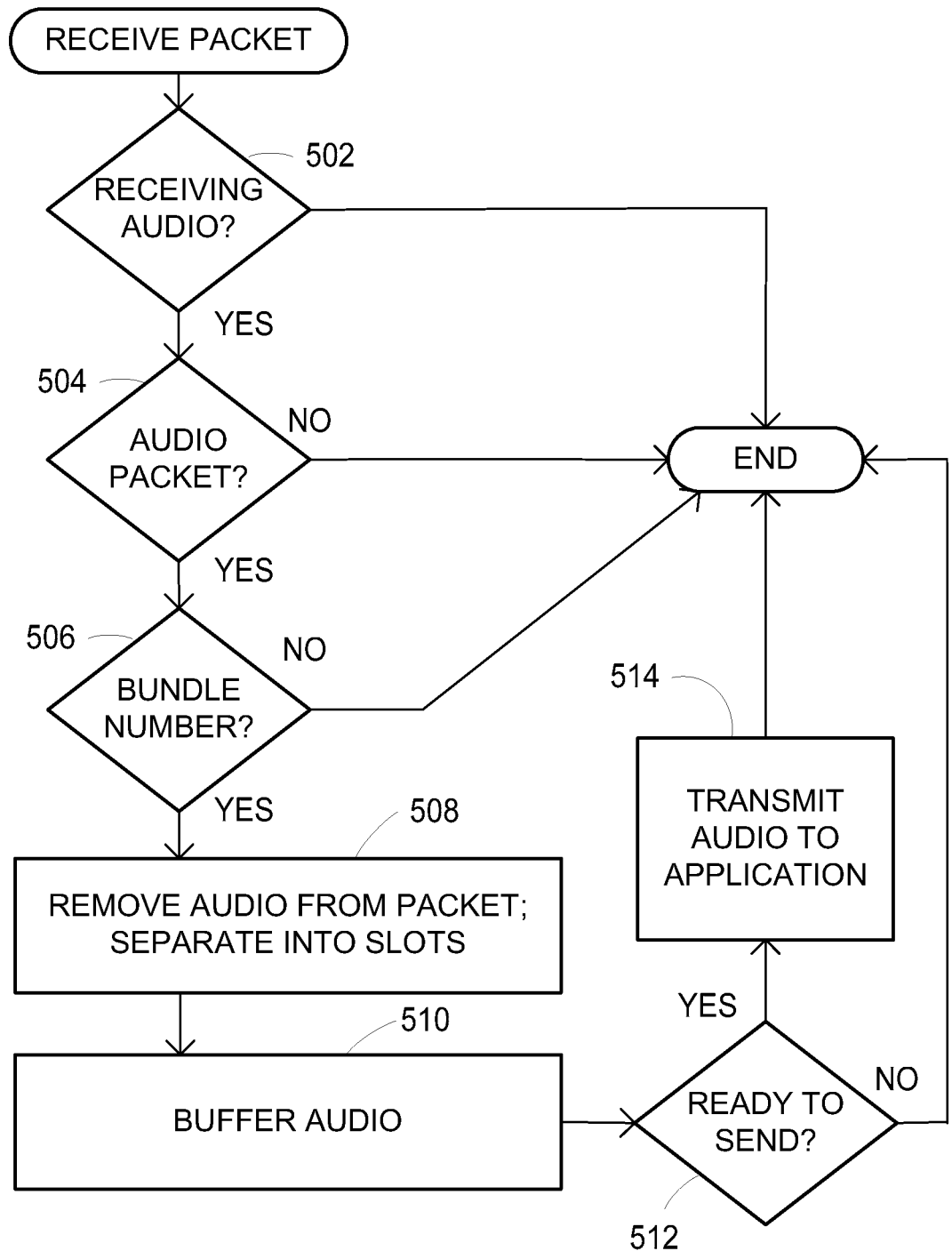
FIG. 5 is a reception flow chart for an isochronous audio driver.

In FIGS. 4 and 5, when an isochronous audio packet is received by the network interface 302 an interrupt request may be generated. When the operating system transfers control to the network interface 302, the isochronous audio packet may be passed by the network driver 310 to the isochronous audio driver 320. The isochronous audio driver 320 may identify the packet as related to audio data and begin processing the packet. Upon receipt of an isochronous audio packet, the isochronous audio driver 320 may determine whether the isochronous audio application 322 is authorized to receive audio data at 502. Authorization includes determination of whether the isochronous audio software 324 is authorized to be enabled as previously discussed. If it is not authorized to receive audio data, then the isochronous audio driver 320 waits for the next packet. Otherwise, at 504 the isochronous audio driver 320 may determine whether the received packet is an isochronous audio packet. If it is not an isochronous audio packet, the isochronous audio driver 320 stops until it receives the next packet. If the received packet is an isochronous audio packet, then at 506 the isochronous audio driver 320 may determine whether the packet's bundle number is the bundle number that the isochronous audio application 322 is currently processing. If the packet's bundle number is not a bundle number that the isochronous audio application 322 is currently processing, the isochronous audio driver 320 stops until it receives the next packet.

When the packet has a bundle number that is currently being processed, at 508 the isochronous audio driver 320 may extract audio data from the packet and separates the audio data into slots or channels based on information included in the header of the packet. At 510 the isochronous audio driver 320 may store the audio data in the receive buffer 328. At 512, the isochronous audio driver 320 may determine whether the audio data in the receive buffer 328 should be sent to the isochronous audio application 322 based on the authorization status. If it should not be sent to the isochronous audio application 322, then isochronous audio driver 320 stops until it receives the next packet. If the audio data in the receive buffer 328 is authorized to be sent to the isochronous audio application 322, then at 514 the isochronous audio driver 320 may transmit the audio data to the isochronous audio application 322. A synchronization packet and the timing information included therein are not needed to process an isochronous audio packet received from the network 116.

The isochronous audio application 322 may further process the audio data to obtain a desired format for conversion to audio sound. For example, the isochronous audio application 322 may resample the audio data to a compatible frequency, such as 44 KHz. The isochronous audio application 322 may also divide the audio data into a determined number of channels such as a left and right channel for stereo or 5 or more channels for surround sound. In addition, the isochronous audio application 322 may change the format of the audio data, such as from pulse code modulation to MP3. The isochronous audio application 322 may also store the processed audio data in memory, for example, in a magnetic media such as a hard drive of a computer.

The isochronous audio driver 320 may run as a system process in the driver level of the operating system, so that it has a higher priority than some applications operated substantially in parallel with the isochronous audio software 324 by the operating system. In addition, the isochronous audio driver 320 may be very "lean," to minimize processing time of the audio data.

Figure 6:
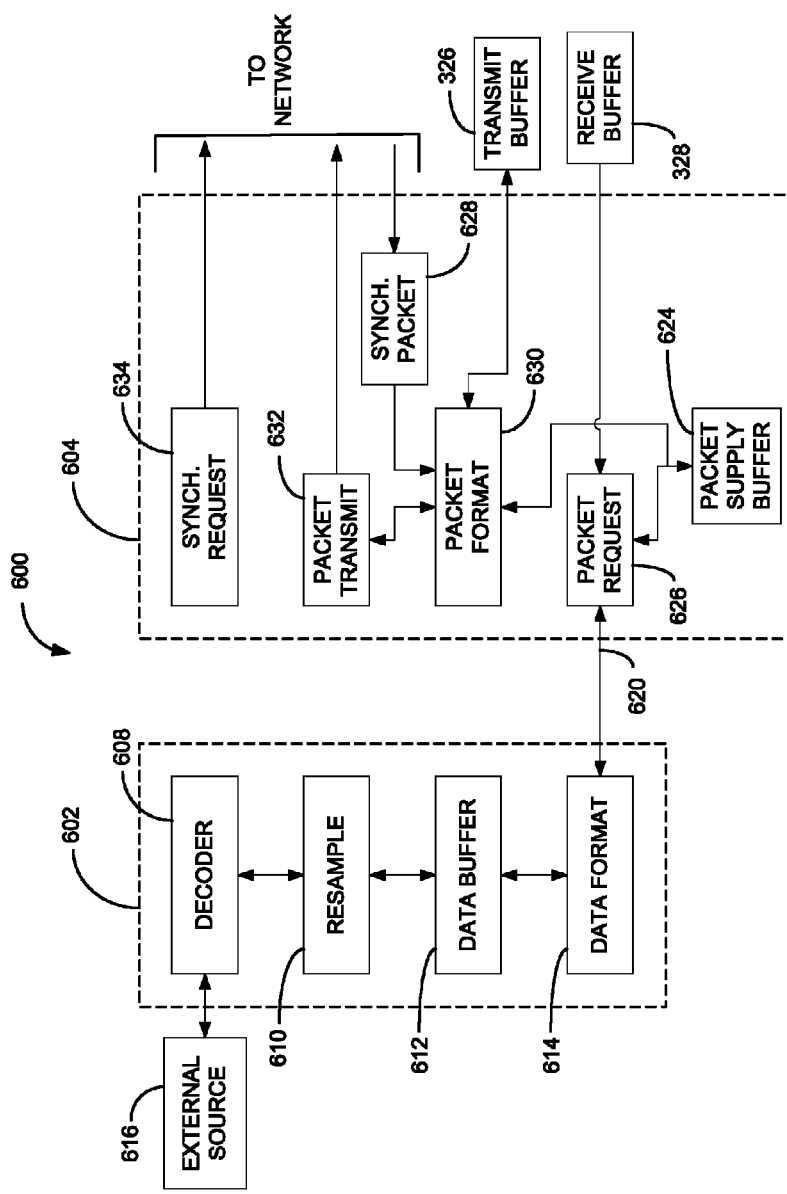
FIG. 6 is a block diagram of a portion of a fourth isochronous audio controller.

The direct communication between the isochronous audio driver 320 and the isochronous audio application 322 facilitates high-speed operation, so that the isochronous audio driver 320 is able to process (transmit and receive) about 750 isochronous audio packets per second. Accordingly, due to the use of interrupts requested by the network interface 302, operation of the driver level and minimized processing time, processing of isochronous audio packets by the isochronous audio software may occur in substantially real time.
Fourth Isochronous Audio Controller FIG. 6 is a block diagram example of a portion of an isochronous audio controller 600 operating in a multi-tasking multi-threaded operating system with other applications. The illustrated isochronous audio controller 600 includes an isochronous audio application 602, an isochronous audio driver 604, the transmit buffer 326 and the receive buffer 328. The isochronous audio application 602 includes a decoder module 608, a resampling module 610, a buffer module 612 and a data format module 614 to convert the audio data between various formats. In other examples, fewer or greater numbers of modules may be depicted to illustrate the described functionality of the isochronous audio application 602.

The decoder module 608 may be any form of conversion process for converting audio data between one or more formats, such as between MP3 or DTS data and pulse code modulation (PCM) data. For example, an external source of audio data 616, such as a source file stored in memory, a CD player, etc. may be in MP3 or DTS format that is used to produce audio sound. Accordingly, the isochronous audio application 602 executed within an operating system may process a source file retrieved from a memory device such as a magnetic media also accessible from within the operating system. In addition, a source file created by the isochronous audio application 602 may be stored in a memory device accessible with the operating system. The decoder module 608 may also be capable of separating the audio portion of video data and forwarding the video portion to a video processing device such as a video card.

The resampling module 610 may be any form of sample rate conversion apparatus for converting between one or more rates at which audio data was sampled. For example, audio data may be resampled between 44.1 KHz and 48 KHz. Where the audio data is already at the desired sample rate for storage or retrieval from a source, the resampling module 610 may be omitted.

The buffer module 612 may provide temporary storage of audio data to be transmitted over the network and temporary storage of audio data received from the network. For example, audio data may be temporarily stored in the buffer module before and after being processed by the resampling module 610.

The data format module 614 may convert the audio data to format compatible with packet-ized transmission of the audio data. In addition, the data format module 614 may provide format conversion functionality to change the presentation format of the audio data within the packets. For example, the data format module 614 may convert audio data between a 32 bit format and a predetermined 16 bit block format. Where the audio data is in the desired format for packet transmission, the format functionality within the data format module 614 may be omitted.

The data format module 614 may also be configured to communicate with the isochronous audio driver 604. Accordingly, audio data may be received by the isochronous audio driver 604 from the isochronous audio application 602 for transmission over the network. In addition, audio data in an isochronous audio packet may be received from the network, and the audio data may be extracted and passed to the isochronous audio application 602 from the isochronous audio driver 604. Audio data and requests for audio data may be transmitted between the isochronous audio application 602 and the isochronous audio driver 604. A communication link 620 provides a two way communication path between the isochronous audio application 602 and the isochronous audio driver 604. The communication link 620 may be wireline, wireless, optical or any other form of communication interface.

The example isochronous audio driver 604 includes a packet supply buffer 624, a packet request module 626, a synchronization packet module 628, a packet format module 630, a packet transmit module 632 and a synch request module 634. In other examples additional or fewer modules may be depicted to describe the functionality of the isochronous audio driver 604.

The packet supply buffer 624 may be any mechanism for temporarily storing audio data received from the isochronous audio application 602. When isochronous audio packets are being prepared for transmission over the network, the packet request module 626 may monitor the packet supply buffer 624. A packet request may be generated and transmitted via the communication link 620 when the packet request module 626 determines that the packet supply buffer 624 is less than full of audio data, or below a predetermined level. In addition, the packet request module 626 may communicate audio data received from the network to the data format module 614. The audio data received from the network may be buffered data provided to the packet buffer 626 from the receive buffer 328 (FIG. 3).

The synchronization packet module 628 may be configured to receive and analyze synchronization packets transmitted via the network. As previously discussed, the synchronization packets are transmitted over the network to the network interface 202 (FIG. 2). Upon receipt by the isochronous audio driver 604, the packets may be provided to the synchronization packet module 628. The synchronization packet module 628 may extract timing information from the synchronization packet. More specifically, the synchronization packet module 628 may confirm that the packet is a synchronization packet. In addition, the synchronization packet module 626 may strip off the header of the packet and verify the unique ID indicating that the packet is related to isochronous data transmission. Further, timing information, such as the frame number, the bundle number and the MAC address may be stripped off of the packet and verified as correct. If the information is correct, the frame number may be parsed out of the packet and forwarded to the packet format module 630.

The packet format module 630 may create isochronous audio data using audio data from the packet supply buffer 624. The isochronous audio data may be created as previously discussed in accordance with a predetermined format such as a CobraNet format. The audio data in the packet supply buffer 624 may be retrieved and converted to isochronous audio data by the packet format module 630. Isochronous audio data created by the packet format module 630 may be stored in the transmit buffer 326.

The packet format module 630 may generate the isochronous audio packet using the isochronous audio data included in the transmit buffer 326. The packet format module 630 may add the frame number provided from the synchronization packet module 628 to the isochronous audio data. The bundle number and any other identifying information may also be added to the header of the isochronous audio data by the packet format module 630. Once the isochronous audio packet is assembled, the data is provided to the packet transmit module 632. The packet transmit module 632 provides the fully assembled isochronous audio packet to the network interface driver 310. (FIG. 3) The network interface driver 310 passes the isochronous audio packet to the network interface 302 for transmission over the network 116. (FIG. 3)

The synch request module 634 may create requests that are transmitted over the switching network to elicit transmission over the switching network of a synchronization packet. Requests may be generated at predetermined intervals by the synch request module 634 to maintain a steady supply of synchronization packets. A steady supply of synchronization packets allows a steady stream of outgoing isochronous audio packets since one synchronization packet is received for each isochronous audio packet transmitted.

During operation, a request may be transmitted over the network by the synch request module 634. In response, the synchronization module 628 may receive a synchronization packet. After verification, the synchronization module 628 may decode the packet and parse out the frame number, which is provided to the packet format module 630. An isochronous audio packet may be generated in response to receipt of the synchronization packet. The isochronous audio packet may be generated by the packet format module 630. The isochronous audio packet may be generated from the isochronous audio data stored in the transmit buffer 326. The isochronous audio data may be retrieved and inserted into the isochronous audio packet by the packet format module 630. The isochronous audio packet may then be forwarded by the packet transmit module 632 to be transmitted over the network.

Upon receipt of an isochronous audio packet, on the other hand, the packet is provided to the packet request module 626. The packet request module 626 confirms the bundle number of the isochronous audio packet is the bundle number currently being processed, decodes the packet and extracts the audio data. The audio data is transmitted to the data format module 614 via the communication link 620. Accordingly, the isochronous audio application 602 receives audio data that is in a format compatible with further processing. The audio data is reformatted, if needed, and placed in the data buffer 612. The resample module 610 may convert the sample rate of the audio data to a desired sample rate, such as the sample rate of 44.1 kHz for a CD disc. The decoder 608 may convert the audio data to a format compatible with an external source 616, such as an MP3 file. The converted audio data may be provided to an external source such as a CD player, a digital amplifier or storage media such as a hard drive.

The previously described processing of packets incoming from the switching network and the generation of isochronous audio packets that are outgoing to the switching network is performed at the driver level of a multi-tasking, multi-threaded operating system by the isochronous audio software. Since operation of the isochronous audio software is executed by the operating system during an interrupt requested by the network interface 302 (FIG. 3), processing of the audio data can occur in substantially real time. As a result of the substantially real time operation of the isochronous audio software within a multi-tasking, multi-threaded operating system, existing systems and process within the operating system may be used. In addition, as a result of a single interrupt, identification, sorting and processing of the packets by the isochronous audio driver 604 may all occur at the driver level. The single interrupt also allows execution of the isochronous audio application 602 just above the driver level by the operating system. Accordingly, audio data may be processed efficiently and effectively without specialized and/or dedicated hardware.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A computer system, comprising:
   a memory; and a processor in communication with the memory, the memory comprising computer instructions executable by the processor, the computer instructions comprising:

an isochronous audio application executable to format audio data received from a source of audio data; and an isochronous audio driver in communication with the isochronous audio application, the isochronous audio driver executable to convert the formatted audio data to isochronous audio data and buffer the isochronous audio data, where the isochronous audio driver and the isochronous audio application are executable within a multi-tasking operating system;

where the isochronous audio driver is further executable to generate an isochronous audio packet that includes the buffered isochronous audio data, and the isochronous audio packet is for transmission over the switched network; and where, in response to only one interrupt request generated by the multi-tasking operating system, the isochronous audio application and the isochronous audio driver execute sequentially as a group without interruption to process the audio data and generate the isochronous audio packet for transmission over the switched network.

2. The computer system of claim 1, where the isochronous audio driver is executable to receive data packets from a protocol stack executable within the multi-tasking operating system and to provide the data packets to a network driver for transmission over the switched network, the data packets including information unassociated with the isochronous audio data.

3. The computer system of claim 1, where the isochronous audio packet is formatted in accordance with a CobraNet specification.

4. The computer system of claim 1, where the isochronous audio driver is executable to generate the isochronous audio packet in response to receipt of a synchronization packet.

5. The computer system of claim 1, where the isochronous audio driver includes a packet request module configured to request the formatted audio data from the isochronous audio application whenever a packet supply buffer included in the isochronous audio driver is less than full.

6. The computer system of claim 1, where the isochronous audio driver includes a packet request module, a packet supply buffer module and a packet format module, where the packet request module is configured to monitor the packet supply buffer and request additional audio data from the isochronous audio application whenever the packet supply buffer is not full, and the packet format module is configured to extract the audio data from the packet supply module and format the audio data to form the isochronous audio data.

7. The computer system of claim 1, where the isochronous audio data includes data indicative of the resolution of a plurality of audio data samples included in the isochronous audio data, data indicative of the frequency of the audio data samples, and data indicative of the number of channels of audio data that are included in the isochronous audio data.

8. A computer system, comprising:

a memory; and a processor in communication with the memory, the memory comprising computer instructions executable by the processor, the computer instructions comprising:

a network interface driver executable within a multi-tasking operating system to receive a stream of packets over a switched network for an application, the stream of packets including isochronous audio packets; and isochronous audio software executable within the multi-tasking operating system to process the stream of packets and provide audio data included in the isochronous audio packets to the application; and where, in response to a single interrupt request provided by the multi-tasking operating system, the network interface driver, the isochronous audio software, and the application are executed as a group without interruption to process the isochronous audio packets received via the switched network.

9. The computer system of claim 8, where the isochronous audio packets are a first set of isochronous audio packets, and where the isochronous audio software is further executable to generate, and initiate transmission of, a second set of isochronous audio packets in response to receipt of a synchronization packet over the switched network.

10. The computer system of claim 8, where the application is a first application, and the isochronous audio software is further executable to pass data packets that are received over the switched network to a second application through a protocol stack without any processing of the data packets by the isochronous audio software.

11. The computer system of claim 8, where the isochronous audio software comprises an isochronous audio driver executable at a driver level of the multi-tasking operating system.

12. The computer system of claim 8, where the isochronous audio software comprises an isochronous audio driver and the multi-tasking operating system is operable in a safe mode in which the isochronous audio driver is enabled to be executed and the application is disabled.

13. The computer system of claim 8, where the isochronous audio software is configured to be executable in a pre-configured and pre-existing operating system utilizing pre-existing and pre-configured hardware.

14. The computer system of claim 8, where the audio data in the isochronous audio packets is uncompressed.

15. A computer implemented method of communicating audio over a switched network, comprising:

receiving a stream of packets from the switched network via a network interface, the stream of packets including isochronous audio packets;

generating a first interrupt request to a multi-tasking operating system by the network interface in response to receipt of the stream of packets;

receiving with the network interface a second interrupt request generated by the multi-tasking operating system;

providing the stream of packets to an isochronous audio driver with a network interface driver executable within the multi-tasking operating system, the providing the stream of packets being in response to receipt of the second interrupt request;

processing the stream of packets with the isochronous audio driver in response to the receipt of the second interrupt request by passing isochronous audio data included in the isochronous audio packets to an isochronous audio application from the isochronous audio driver; and executing, with the multi-tasking operating system, the network interface driver and the isochronous audio driver substantially in parallel with the isochronous audio application, where providing the stream of packets to the isochronous audio driver, processing the stream of packets with the isochronous audio driver, and passing the isochronous audio data to the isochronous audio application are executed in the multi-tasking operating system without interruption in response to a single interrupt request from the multi-tasking operating system, and where the single interrupt request is included in the second interrupt request.

16. The method of claim 15, where the stream of packets includes data packets unrelated to the isochronous audio packets, processing the stream of packets with the isochronous audio driver further comprises passing the data packets unmodified from the isochronous audio driver to a protocol stack, the protocol stack being for communication on the switched network by at least one application, and the protocol stack and the at least one application are executed substantially in parallel with the network interface driver, the isochronous audio driver, and the isochronous audio application.

17. The method of claim 16, where the isochronous audio packets are transmitted in response to receipt of a synchronization packet and the data packets are not transmitted in response to receipt of the synchronization packet.

18. The method of claim 15, where processing the stream of packets with the isochronous audio driver further comprises determining whether a packet is an isochronous audio packet.

19. The method of claim 15 further comprising extracting the isochronous audio data with the isochronous audio driver.

20. The method of claim 15, further comprising extracting the isochronous audio data from the isochronous audio packets with the isochronous audio application, where passing the isochronous audio data to the isochronous audio application from the isochronous audio driver comprises passing the isochronous audio packets to the isochronous audio application.

* * * * *